United States Patent Office.

CHARLES W. WESTOVER, OF ST. JOSEPH, MISSOURI, ASSIGNOR TO HIMSELF AND E. J. CARTER, OF SAME PLACE.

Letters Patent No. 101,687, dated April 5, 1870.

IMPROVED COMPOSITION FOR PAINT, CEMENT, &c.

The Schedule referred to in these Letters Patent and making part of the same.

To all whom it may concern:

Be it known that I, CHARLES W. WESTOVER, of St. Joseph, in the county of Buchanan and State of Missouri, have made certain new and useful Improvements in Cement Paint, and other Paints and Pigments; and I do hereby declare the following to be a full and true description thereof in its ingredients and method of preparation and application.

The object of this invention is, principally, to form a paint or surface-coating for brick, stone, wood, and similar matter, which shall be impervious to moisture, and readily harden and dry, to form an enduring protection; and, moreover, the advantage arising from the preparation and materials here used is largely one of greater economy of cost, added to that of greater durability over pains in ordinary use.

To enable those herein skilled to make and use my said improved paint and pigment, I will fully describe the same.

I use the ingredients in the proportions and manner, as follows:

Of salt, (usually ordinary mercantile salt,) five (5) pounds; of mercantile glue, three (3) pounds; of copperas, two (2) pounds; of alum, one (1) pound; of blue vitriol, (sulphate of copper,) one (1) pound. These I dissolve, at ordinary temperature, in twenty (20) gallons of clear water, mixing the same well until a perfect solution is obtained.

When to be used a sufficient quantity of good hydraulic cement is added to give to the admixture the consistency of ordinary whitewash. If it be desired to achieve any particular color, then the corresponding dry paint or mercantile pigment, such as white lead, ocher, or other substance will be added.

For rough wood-work, cement may be omitted, the dry pigment being added to the water solution before described.

As the cement paint dries and hardens rapidly, it is important to mix the cement with the water solution about the time of use and application. A common whitewashing-brush, or the usual painters' or plasterers' brush, will be used for spreading the paint upon the surfaces to be coated. Owing to the action of the glue, the pigment adheres firmly to the surface of application, whilst alum and salt act to harden and vitriol to retain the coloring pigment, as well as, with the copperas or equivalent salt, to desiccate the mass.

I do not limit myself to the specific substances and ingredients before described, as I am aware that sundry and various of said ingredients may be replaced in chemical action; and it is therefore believed that all substances chemically equivalent to those hereinbefore specified are included by the nature and scope of this invention.

Having thus fully described my invention,

What I claim is—

1. The solution, in water or similar fluid, of the ingredients first hereinbefore mentioned, substantially as set forth.

2. The combination of cement and paint pigments, or either thereof, with the solution aforesaid, substantially as set forth.

In testimony whereof I have hereunto set my hand in the presence of—

CHARLES W. WESTOVER.

Witnesses:
   THOS. B. WEAKLEY,
   JAMES HALL.